F. B. COOK.
ELECTRICAL PROTECTIVE APPARATUS.
APPLICATION FILED JULY 15, 1909.

966,655.

Patented Aug. 9, 1910.

WITNESSES:
Frances K. Parker.
Maude J. Ball.

INVENTOR:
FRANK B. COOK
BY Frederick R. Parker.
ATTORNEY.

UNITED STATES PATENT OFFICE.

FRANK B. COOK, OF CHICAGO, ILLINOIS.

ELECTRICAL PROTECTIVE APPARATUS.

966,655.  Specification of Letters Patent.  Patented Aug. 9, 1910.

Application filed July 15, 1909.  Serial No. 507,772.

*To all whom it may concern:*

Be it known that I, FRANK B. COOK, a citizen of the United States of America, residing at Chicago, in the county of Cook and State of Illinois, have invented new and useful Electrical Protective Apparatus, of which the following is a specification, reference being had to the accompanying drawings, illustrating same.

My invention relates to electrical protective apparatus and in particular to telephone switchboard protectors.

The principal objects of my invention are, to provide improved protective apparatus of the character hereinafter specified; to provide an improved telephone switchboard protector embodying electrothermal protectors, fuses and lightning arresters; and to provide an improved electrothermal protector for such apparatus.

Other objects will be apparent from the following specification.

Figure 1:
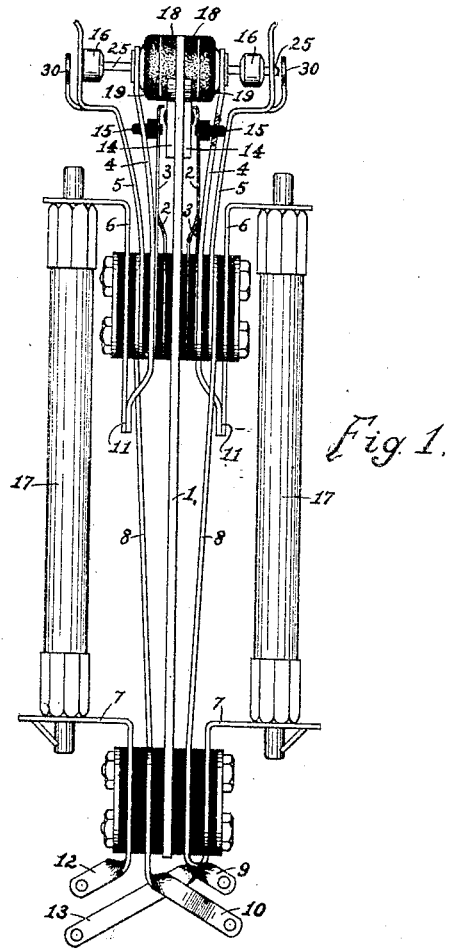
Figure 2:
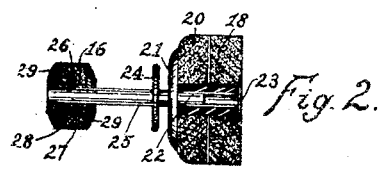

In the accompanying drawings illustrating the preferred form of my invention, Figure 1 is a plan view of a bank of protective apparatus constructed in accordance with this invention: and Fig. 2 is a cross-sectional view of the electrothermal protector and lightning arrester used in the apparatus of Fig. 1, with portions shown in elevation.

In some instances it is very desirable to have fuses in connection with heat coils and lightning arresters at a central telephone exchange, for protecting the lines of the system, without having the fuses on a separate rack from the other protectors and thereby necessitating considerable extra wiring and expense. With this particular object in view I have provided the protective apparatus shown in the drawings, in which the inclosed fuses are associated with the heat coils and lightning arresters in such a manner that no extra fuse rack or wiring is required for accommodating the fuses or connecting the several protective devices as protectors for the various circuits. In addition to this I have provided in this invention an embodiment of protective apparatus in which the fuses, electrothermal protectors and lightning arresters constitute a single piece of apparatus, adapted to be mounted on a cross-connecting rack in banks in a manner well understood. These banks of the complete apparatus may be added to the cross-connecting rack as desired, as the exchange grows, to accommodate the increased number of lines. It will be readily seen that such a protector greatly simplifies the apparatus and the wiring of such systems.

By reference to the accompanying drawings, 1 is a mounting plate on which are mounted spring members 2 2, 3 3, 4 4, 5 5, 6 6 and 7 7, preferably as shown, the spring members 5 5 being electrically connected with metallic strips 8 8 which terminate at the rear of the bank of protectors in switchboard terminals 9 and 10. Of course it will be readily understood that any number of pairs of the protective apparatus shown may be mounted on a single mounting plate 1. Spring members 4 and 6, on each side of the plate 1, are preferably soldered together at 11 so that they make electrical connection with each other. Spring members 17 17 terminate at the rear of the plate 1 in line terminals 12 and 13, preferably as shown. Spring members 4 4 make electrical connection with spring members 3 3, respectively. Spring members 2 and 3, on each side of the plate 1, lie in the same plane so that they can be readily operated and made to contact the corresponding strip 14 of the plate 1, by an insulating bushing 15 which is operated by the corresponding spring 5 when the corresponding electrothermal protector 16 gives way in a manner hereinafter described.

Inclosed fuses 17 17 are held in place by spring members 6 7, 6 7, respectively, in a manner well understood. These fuses 17 17 are preferably of the noninflammable type. It will readily be seen that the fuses 17 17 may be removed as desired, by simply forcing the forward ends of same out away from the plate 1.

The lightning arresters 18 18, each comprising a pair of carbon disks with a suitable dielectric interposed therebetween, are mounted between springs 4 4, respectively, and the mounting plate 1, preferably as shown, the inner carbon of each arrester preferably fitting into a semicircular notch, as 19, in the corresponding strip 14, which holds the arrester against lateral displacement. The outer carbon 20 of each arrester is held in place by a disk 21 having a projecting end portion 22 thereon extending into the carbon 20 and insulated from the inner carbon by an insulating bushing 23 which extends through a hole in the carbons as shown in Fig. 2. Each spring 4 fits into an annular groove formed by the disk 21 and the annular projection 24 of the pin 25 which extends out from the disk 21, the said springs 4 4 bearing inwardly against the disks 21 21 to securely hold the lightning arresters in place. The mounting plate 1 is preferably grounded to provide a ground connection for the lightning arresters 18 18.

The electrothermal protector 16 comprises a spool 26 soldered on the outer end of the pin 25 by an easily-fusible solder, an external metal shell 27, and a resistance filler 28 between the spool 26 and the shell 27, the ends of the shell 27 being formed over as at 29 to tightly compress the resistance material 28 so as to keep same of the desired resistance. The shell 27 is insulated from the spool 26 by mica disks 31 31 placed against the outside ends of the spool 26 before the shell 27 is finally formed over. The ends of the spool 26 are preferably made hexagonal in form so as to prevent turning of the parts one on the other. The shell 27 being formed over at the ends under considerable pressure, firmly holds the various parts together and makes a very substantial heating element which remains at practically a uniform resistance. It will be readily seen that this electrothermal protector is very simple and that there are no inflammable parts used in its construction.

In assembling the electrothermal protector, one end of the shell 27 is first formed over as shown at 29, then one of the mica disks 31 is dropped into the shell 27, then the spool 26 is dropped into the shell 27 on top of the mica disk 31, then the comminuted resistance material 28 is packed into the shell 27 around the spool 26, then the other mica disk 31 is dropped into the open end of the shell 27 on top of the spool 26, and finally the open end of the shell 27 is formed over as shown at 29, as much as is desired, to properly adjust the resistance through the whole and firmly hold the parts together.

As the spring 5 makes electrical connection with the shell 27 of the electrothermal protector, and as the spring 4 makes electrical connection with the pin 25, as clearly shown in Fig. 1, it will readily be seen that the circuit through a set of the protective apparatus, on either side of the plate 1, extends from a line terminal 12 (or 13) through spring 7, inclosed fuse 17, spring 6, connection 11, spring 4, pin 25, spool 26, resistance material 28, shell 27, spring 5, and terminal strip 8 to switchboard terminal 10 (or 9). When an abnormally large current (generally termed a "sneak current") traverses this circuit it produces heat in the resistance material 28, which heat softens the easily-fusible solder, between the spool 26 and the pin 25 and thereby permits the heating element 16 as a whole to be slid longitudinally along the pin 25 as desired. Now the spring 5 slides the heating element 16 as a whole, on the pin 25 toward the mounting plate 1 to approximately the position shown on the right of Fig. 1, the spring 5 in its operation engaging the corresponding insulating bushing 15 and causing same to bear the corresponding springs 2 and 3 into contact with the corresponding metal strip 14 of the ground plate 1, thus grounding the spring 4 which is connected through the corresponding inclosed fuse 17 to the line, and also grounding the corresponding spring 2 which may be connected with a suitable alarm in a manner well understood.

Each of the springs 5 5 is provided with a leg 30 thereon adapted to engage the outer end of the corresponding pin 25, if desired, to ground also the switchboard spring 5, through spring 4 and the corresponding pin 25. In the drawings, however, the spring 5 and the leg 30 thereon, on the right of Fig. 1, are shown out of contact with the electrothermal protector 16 and the pin 25, after the protector 16 has been operated, thus maintaining the circuit to the switchboard open after the operation of the protector 16. This condition is obtained by simply adjusting the parts so that the resiliency of the spring members 2, 3 and 5 causes the switchboard spring 5 to spring back slightly away from the heating element 16 and pin 25, after its sudden movement toward the mounting plate 1 in operating the heating element 16 on the pin 25. If, however, it is desired to ground the switchboard spring 5 when the line spring 4 is grounded, the leg 30 of the spring 5 is adjusted so that it will remain in contact with the pin 25 after the electrothermal protector has been operated. Thus it will be seen that with this construction and arrangement, the switchboard spring 5 may be either grounded or disconnected from the line, upon the operation of the electrothermal protector, whichever is desired. To reset the electrothermal protector for another operation, it is only necessary to reheat the easily-fusible solder between the spool 26 and the pin 25, in any suitable manner, slide the heating element 16 as a whole back to the outer end of the pin 25, and then permit the easily-fusible solder to cool whereupon the apparatus will be reset for operation as shown on the left of Fig. 1.

The purpose and operation of the fuses 17 17 and lightning arresters 18 18 are believed to be well understood without further description. The fuses, however, in this apparatus are preferably made to carry considerable more current than that required to operate the electrothermal protectors, and are intended to blow to protect the switchboard circuits from only heavy currents.

When it is desired to remove a lightning arrester 18 and the corresponding electrothermal protector from the apparatus, it is only necessary to force same from the grasp of the corresponding spring 4, in a manner well understood.

I do not wish to limit this invention to all of the particular details herein set forth, as various modifications of same may be made without departing from the scope of the appended claims.

What I claim as my invention is:

1. A protector of the character described comprising a mounting plate, a series of sets of spring members mounted along the said plate, a series of lightning arresters mounted along the said plate near the front edge thereof, by some of the said spring members, a series of electrothermal protectors mounted along the said plate near the front edge thereof, by some of the said spring members, a series of inclosed fuses mounted along the said plate by some of the said spring members, to the rear of the said electrothermal protectors and lightning arresters, and suitable line and switchboard terminals at the rear edge of the said plate connected with the said protective devices, all for purposes substantially as described.

2. Electrical protective apparatus of the character described comprising a mounting plate, a plurality of mountings on the said plate, each mounting having a plurality of spring members mounted thereby, an electrothermal protector and a lightning arrester carried by the spring members of one mounting, a fuse carried by a spring member of each of the said mountings, and electrical connections extending from the electrothermal-protector mounting to the other mounting whereby both line and switchboard terminals for the protective devices are located in close proximity to each other.

3. Electrical protective apparatus of the character described comprising a ground plate, a pair of mountings on the said plate, said mountings having spring members mounted on the said plate thereby, an electrothermal protector and a lightning arrester carried by the spring members of one of the said mountings, a fuse carried by a spring member of each of the said mountings, and an electrical connection extending from one of the said mountings to the other, for purposes substantially as set forth.

4. Electrical protective apparatus of the character described comprising a mounting plate, a series of spring members mounted along the said plate and suitably insulated from each other, a series of lightning arresters mounted along the said plate near the forward edge thereof, a series of electrothermal protectors mounted along the said plate in the vicinity of the said arresters, a series of inclosed fuses mounted along the said plate to the rear of the said electrothermal protectors and lightning arresters, the said spring members being arranged to connect the said fuses in series with the respective electrothermal protectors, and the said lightning arresters as third-legs to the respective said series circuits, and electrical connections whereby the various terminals for the said protectors are all located in the same vicinity.

5. Electrical protective apparatus of the character described comprising a mounting plate having a plurality of mountings thereon, some located medially regarding the said plate and others located near the rear edge of the said plate, each of the said mountings having spring members mounted thereby and insulated from each other, lightning arresters and electrothermal protectors carried by the said spring members near the forward edge of the said plate, means for causing the suitable switching of the various circuits upon the operation of the electrothermal protectors, inclosed fuses carried by the said spring members and extending substantially from the said medial mountings to the said rear mountings, the said fuses being connected in series with the respective electrothermal protectors, and the lightning arresters being connected as third-legs to the said respective series connections, the said fuses having line terminals in the vicinity of the said rear mountings, and electrical connections extending from the said medial mounting to the said rear mountings, underneath the respective fuses, whereby switchboard terminals for the apparatus are provided in the vicinity of the said rear mountings and line terminals, substantially as described.

6. An electrothermal protector comprising a spool and an outer metallic casing therefor suitably insulated from each other, comminuted resistance material held under compression between the said spool and outer casing, a stationary pin soldered through the said spool by easily-fusible solder, and means for automatically moving the said spool, resistance material and casing as a unit, relatively to the said pin upon an abnormally large current in the protector, for purposes substantially as described.

7. An electrothermal protector comprising a stationary pin, and a heating element movable relatively thereto upon abnormal heating, and normally secured thereto by heat-susceptible material, the said heating element comprising a spool, an outer shell, insulating disks at the ends of the spool insulating same from the said shell, and comminuted resistance material between the said spool and shell, the latter being formed over at the ends whereby the said resistance material is held under pressure.

8. A heating element for an electrothermal protector comprising inner and outer metallic members providing an annular space therebetween and insulated from each other, and comminuted resistance material within the said annular space, the said outer metallic member being formed over whereby the said resistance material is held under pressure.

9. A heating element for an electrothermal protector, comprising inner and outer metallic members, one surrounding the other and insulated therefrom, and resistance material placed between the said metallic members, the outer metallic member being formed over whereby the said resistance material is held under pressure, the said inner metallic member having a hole therethrough for accommodating a pin for purposes substantially as described.

10. A heating element for an electrothermal protector, comprising a spool, a metallic casing surrounding the spool, mica disks at the ends of the spool insulating the latter from the said casing, and comminuted resistance material in the said casing around the said spool, the said casing being formed over at its ends against the said mica disks whereby the parts of the device are substantially held together.

11. In electrical protective apparatus, a lightning arrester comprising a pair of circular disks having a suitable dielectric therebetween, a metallic disk bearing against one of the said lightning-arrester disks and having an inwardly-projecting pin and an outwardly-projecting pin integral therewith, the said inwardly-projecting pin projecting into one of the said lightning-arrester disks, a spring member bearing against the said metallic disk to hold the lightning arrester in place, an electrothermal heating element encircling the said outwardly-projecting pin and normally secured thereto by heat-susceptible material, and a second spring member bearing against the said heating element whereby the latter is moved longitudinally on the said pin upon an abnormally large current in the said heating element, substantially as described.

12. In electrical protective apparatus of the character described, a mounting plate, a pair of spring members mounted on the said plate, a stationary pin positioned by one of the said spring members and in electrical contact therewith, an electrothermal heating element carried by the said pin and normally secured thereto by heat-susceptible material, one of the said spring members of the pair normally bearing against the said heating element to move same longitudinally on the said pin upon an abnormally large current in the device, and means for grounding the first-mentioned spring member of the pair upon the operation of the apparatus, the second-mentioned spring member of the pair having a portion thereon adapted to engage the said pin upon the operation of the apparatus, to ground the said second spring member of the pair, through the said pin.

13. In electrical protective apparatus of the character described, a mounting plate, a pair of spring members mounted on the said plate, a stationary pin positioned by one of the said spring members and in electrical contact therewith, and an electrothermal heating element encircling the said pin and normally secured thereto by heat-susceptible material, one of the said spring members of the pair normally bearing against the said heating element to move same longitudinally on the said pin upon an abnormally large current in the device, the resiliency of the latter said spring member causing it to recede from the said heating element after the operation of the latter, whereby the circuit through the device is opened.

14. A heating element for an electrothermal device, comprising inner and outer metallic members providing an annular space therebetween, and comminuted resistance material within the said annular space and contacting the said metallic members.

As inventor of the foregoing I hereunto subscribe my name, this 10th day of July, 1909.

FRANK B. COOK.

Witnesses:
FREDERICK R. PARKER,
MAUDE J. BALL.